Nov. 18, 1930. F. W. MAYER 1,781,761
TORQUE CONTROLLED GEAR CHANGING MECHANISM
Filed Sept. 26, 1928
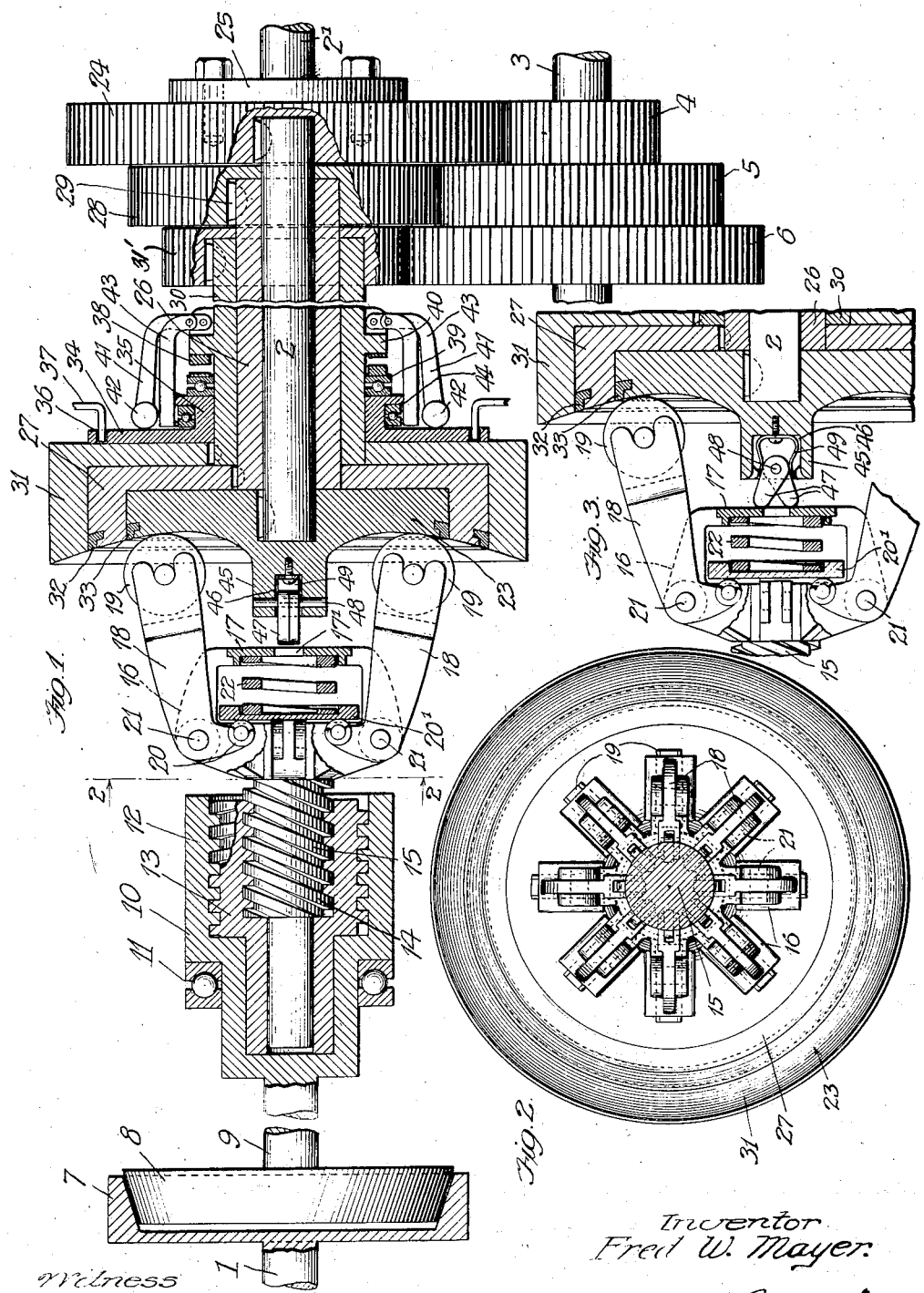
Inventor
Fred W. Mayer.
By Rummler & Rummler
Att'ys.
Witness
Martin H. Olsen Patented Nov. 18, 1930

1,781,761

UNITED STATES PATENT OFFICE

FRED W. MAYER, OF CHICAGO, ILLINOIS

TORQUE-CONTROLLED GEAR-CHANGING MECHANISM

Application filed September 26, 1928. Serial No. 308,387.

This invention relates to an improved automatically operated means for changing the gear ratio between a driving shaft and a driven shaft, and particularly to torque controlled gear changing means for automobile transmissions. The present invention is an improvement of my inventions disclosed in copending application, Serial No. 215,878 filed August 27, 1927, and Patent No. 1,664,303, issued March 27, 1928.

The main objects of my invention are to provide improved automatic clutch mechanism for selectively effecting one of the plurality of different driving connections between driving and driven shafts; to automatically produce that gear ratio between the two shafts which is best suited to overcome the torque on the driven shaft under any usual operating condition; to provide an improved clutch construction in which the driving clutch elements move successively as required by the load from frictional engagement with one driven clutch member into frictional engagement with another driven clutch member to provide automatic gear changing mechanism which is operative in holding down the speed when the vehicle is running down hill; to provide gear changing mechanism for automatically shifting the transmission gears of a vehicle from a high speed arrangement to a low speed arrangement when starting torque on the driven shaft of the vehicle is initially being overcome and to shift the transmission gears to a high speed arrangement thereafter.

A further object of this invention is to provide centrifugally controlled braking means for maintaining a predetermined minimum starting torque on a torque controlled gear shifting mechanism to assure accumulation of sufficient energy in the device to reshift the mechanism to a high speed setting after the starting torque has been overcome and a rapid speed of rotation is attained.

An embodiment of my invention is disclosed in the accompanying drawing, in which Figure 1 is a fragmentary, longitudinal view of my improved gear changing mechanism, partly in section.

Fig. 2 is a transverse section taken on the line 2—2 of Fig. 1.

Fig. 3 is a fragmentary section showing the parts of the mechanism in a different position.

In general my invention embodies a driven unit comprising a plurality of concentrically mounted driven clutch elements each having a driving gear of a different diameter connected therewith, and a variable driving clutch member for selectively driving any one of the driven clutch elements and the gear with which that clutch element is associated.

The selection between the different driven clutch elements is governed by torque controlled mechanism. The variable driving clutch member normally rests in engagement with that clutch element of the driven unit which is directly connected with the high speed gear but when a starting torque is applied on the driven unit and the driving unit attempts to overcome it, the variable clutch member is shifted by the excess of the starting torque over the torque of the driving unit to engagement with a clutch element that is associated with a lower speed gear. When the starting load has been overcome a resilient member which is energized during the initial shifting of the adjustable clutch member reshifts the same into engagement with that clutch element of the driven unit which is directly connected with the high speed gear.

When the normally driven unit drives the normally driving unit, as for example when a vehicle equipped with my improved transmission runs down hill, the variable clutch member is shifted into engagement with a clutch element of the normally driven unit that is associated with a low speed gear and the speed of descent of the vehicle is automatically retarded. In this manner the transmission automatically produces that gear ratio which is best suited for meeting the different driving conditions encountered.

In the form shown a motor shaft 1, is located substantially parallel to a jack shaft 3, which is provided with a nest of transmission gears, comprising a high speed gear 4, an intermediate speed gear 5, and a low speed gear 6. These gears may be integral with each other, and rigidly fixed to the jack shaft 3. A clutch member 7 is mounted on the motor shaft 1 in registration with a clutch member 8 on a shaft 9 of a driving unit.

The driving unit comprises a hollow socket 10 integral with the rearward end of the shaft section 9, and bears against a suitable end thrust bearing 11. The socket 10 is provided with right hand worm threads 12 for receiving the worm threads 14 of an inner sleeve 13. An adjustable clutch member, comprising a shank 15 threaded in the sleeve 13, extends rearwardly from the socket member 10. This adjustable clutch member comprises a casing or housing 16, a rear end wall 17 having an aperture 17′ therein and a plurality of bell crank levers 18 pivotally mounted on the casing.

Each bell crank lever is provided with a friction roller 19 at the end of its long arm and a roller 20 at the end of its short arm. These bell crank levers are arranged symmetrically around the casing 16 and are pivoted thereto by pins 21. A compression spring 22 is located within the casing 16 and bears against the wall 17 thereof. The forward extremity of the spring 22 is provided with a metal cap 20′ which supplies a smooth bearing surface for the rollers 20 of the small arms of the levers.

A driven unit comprising a shaft 2 having a clutch disc 23 keyed to the forward end thereof is provided at its rearward end portion with a high speed transmission gear 24 which in turn is rigidly connected to a driven shaft 2′ by a plate 25. A hollow symmetrical shaft 26 is mounted concentrically on the shaft 2, and is provided at its forward end with a clutch element 27, comprising a short cylinder located concentric with the clutch element 23. The rear end of the hollow shaft 26 is provided with an intermediate speed transmission gear 28, rigidly secured thereto by a key 29. Another hollow symmetrical shaft 30 is mounted concentric with the shaft 2, and the hollow shaft 26. This outermost hollow shaft is provided at its forward end with a clutch element 31 and at its rear extremity with a low speed pinion 31′.

The faces of the clutch elements 23, 27 and 31 are somewhat curved and the surfaces of the adjacent clutch elements are separated by inlaid slip ring members 32 and 33, which form a neutral area for enabling proper operation of the variable clutch member when the latter is moved from engagement with one disc into engagement with another.

When the driving clutch elements are in contact with the high speed driven clutch element 23, the driven shaft 2′ is driven directly by the gear 24 and shaft 2, which is secured to the shafts 2 and 2′. When the driving clutch elements are in contact with one of the lower speed driven clutch elements 27 and 31, the power is transmitted from the gears 28 and 31′ respectively to the shaft 2′ through the nest of gears 4, 5 and 6 on the shaft 3, and the gear 24 which is secured to the shaft 2′.

Rotation of the driven unit is retarded by a braking mechanism which comprises a brake shoe 34 formed in the shape of a disc and mounted concentrically on the hollow shaft 30. The brake shoe 34 comprises a grooved hub 35 and is provided with apertures 36 for receiving the brackets 37 which may be rigidly attached to the transmission casing for restraining the shoe from rotation. The brake shoe is slidably mounted on the brackets 37 and the hollow shaft 30 as shown in Fig. 1 and it is urged against the surface of the driven clutch element 31 by a spring 38 bearing between an anti-friction ring 39 on one side and a flange 40 on the other side, integral with the outer hollow shaft 30. Angular arms 41 are pivotally mounted on the outer hollow shaft 30 and are provided at their free extremities with weights 42. A link 43 is pivotally mounted at one end on each of the angular arms 41 and extends at its other end over the groove in the hub 35 of the brake shoe. The free end of the link 43 is attached to an anti-friction ring 44 which is confined in the groove of the hub 35. When the outer sleeve 30 is rotated at a predetermined speed the arms 41 are swung outwardly and the links 43 move the brake shoe to the right as viewed in Fig. 1 against the action of the spring 38 and out of engagement with the driven clutch member 31.

When the driving mechanism is at rest, the brake 34 is urged against the side of the driven clutch element 31 by the spring 38. This action exerts a predetermined torsional resistance upon the clutch element 31, which the driving clutch unit must overcome before the vehicle can be started in motion. The additional torsional resistance applied by the brake 31 causes the spring 22 to be compressed more than would be required to overcome the starting load alone. When the parts of the transmission have reached a predetermined speed of rotation the centrifugal brake releasing mechanism moves the brake 34 away from the driven clutch element 31, thereby removing the additional resistance. In this manner the accumulation of sufficient energy in the spring 22, to shift the driving clutch element to a higher speed setting after the starting torque has been overcome, is assured. The brake also holds the transmission mechanism in a low speed setting until a substantial speed of rotation is attained.

The central portion of the driven clutch element 23 is provided with a boss 45 having a rectangular recess 46 therein for receiving centrifugally controlled stop arms 47. The arms 47 are freely mounted on a pin 48 and extend outwardly beyond the end of the boss 45. A resilient member or spring 49 is attached to the bottom of the recess and comprises spaced side portions which engage the edges of the stopping members 47 and normally hold the latter in the position shown in Fig. 1, in registration with the aperture 17' in the plate 17. When a predetermined speed of rotation is attained by the boss 45 the arms or stop members 47 swing outwardly against the action of the spring 49.

When the above described transmission is employed in a vehicle the following sequence of operations takes place:

When a vehicle is at rest and the clutch members 7 and 8 are engaged together for transmitting power from the motor shaft 1 to the wheels of the vehicle, there is a large torque on the driven unit due to the starting load. Ordinarily this torque is too large to be overcome by the high speed gear 24, and as a result the socket 10 and sleeve 13 are rotated to the right, relative to the shank 15, causing the latter and the variable clutch member to be moved outwardly to the right as viewed in Fig. 1.

This movement causes the rollers 19 of the variable clutch member to roll radially outwardly from engagement with the high speed clutch element 23 into engagement with one of the lower speed clutch elements. In so doing the short arms of the bell crank levers 18 bear upon the plate 20' of the spring 22 and compress the latter against the end plate 17 of the housing. The bell crank levers 18 remain in their outer position until the torque which is applied on the transmission gears of the driven shaft 3 by the starting load is reduced. After the vehicle is started in motion and when the torque on the motor shaft has overcome the torque on the driven unit the spring 22, bearing against the short arms of the bell crank lever, forces the rollers 19 radially inwardly into engagement with the high speed clutch element 23.

When the vehicle is run down a hill or incline the normally driven unit drives the normally driving unit and the sleeve 13, together with the shank 15, are rotated relative to the socket 10 screwing the sleeve and the adjustable clutch member out of the socket and moving them to the right as viewed in Fig. 1. This movement forces the rollers 19 outwardly radially and into engagement with one of the low speed clutch elements 27 or 31, thus setting the transmission in low gear to check the downward speed of the vehicle on an incline or hill.

The stopping arms 47 serve to hold the variable clutch member in engagement with the high speed gear when the vehicle is rapidly accelerated from one high speed, for example 30 miles per hour, to a higher speed. When the high speed clutch element is rotating rapidly, the arms 47 swing out against the action of the spring 49 into the position shown in Fig. 3, where they engage the plate 17 of the housing and prevent the variable clutch member from moving to the right. When the transmission is running at normal speed or is at rest, the arms 47 are held in alignment with each other by the spring 49 and they extend into the aperture 17' of the plate 17, permitting the variable clutch member to move to the right for shifting the rollers into engagement with one of the low speed clutch elements as above described.

I claim:

1. In a speed changing transmission gearing, driving and driven shafts, variable speed gears for connecting said shafts, means for changing the speed relationship between said gears, said means comprising radially shiftable clutch elements mounted for rotation by the drive shaft, and cooperating rotary clutch elements each having operative connections with different ones of the speed changing gears; said cooperating clutch elements having clutch faces radially spaced apart, and means operable by the difference in torque between the drive and driven shafts for shifting said radially movable clutch elements.

2. In a speed changing transmission gearing, driving and driven shafts, variable speed gears for connecting said shafts, means for changing the speed relationship between said gears, said means comprising radially shiftable clutch elements mounted for rotation by the drive shaft and cooperating rotary clutch elements each having operative connections with different ones of the speed changing gears; said operating clutch elements having clutch faces radially spaced apart, and means operable by the difference in torque between the drive and driven shafts for shifting said radially movable clutch elements, and resilient means for opposing the movement in one direction of said radially movable clutch elements.

3. In a device of the class described, a driven unit comprising adjacently arranged clutch elements, a driving unit comprising a movable housing, a plurality of frictional contact arms comprising bell crank levers pivotally mounted on said housing, rollers on the ends of the long arms of said levers for frictionally engaging said clutch elements, a resilient member in said housing engaging the short arms of said levers for urging the same inwardly, and means operable by the difference in torque between said driven and driving units for shifting said housing against the action of said resilient member.

4. In a device of the class described, the combination with a motor shaft of variable clutch driving means operable by the difference of the torque on said motor shaft and variable clutch driving means respectively for moving said variable clutch driving means, a plurality of driven clutch elements selectively operable by said variable clutch member, a transmission gear operatively connected with each driven clutch element, and a stopping mechanism on one of said clutch elements for retaining said variable clutch member in engagement with a predetermined driven clutch element upon acceleration beyond a predetermined speed of rotation.

5. In a device of the class described, the combination with a motor shaft, of variable clutch driving means operatively connected therewith, a plurality of driven clutch elements selectively operable by said variable clutch member, a transmission gear operatively connected with each driven clutch element, torque controlled mechanism associated with said variable clutch means for shifting the same to overcome torque on said transmission gears comprising a spring, and a worm for moving said variable clutch driving means against the action of said spring, and braking means associated with one of said driven clutch elements for assuring accumulation of sufficient energy in said spring to shift said variable clutch member when the torque on said motor shaft exceeds the torque on said gears.

6. In a device of the class described, in combination with a motor shaft, of a driving unit comprising a housing and a plurality of pivotally mounted contact arms; a spring in said housing for urging said contact arms inwardly, a plurality of driven clutch elements selectively engageable by said contact arms and having curved surfaces; transmission gears operatively connected with said driven clutch elements, means for moving said housing against the action of said spring to rotate the contact arms into engagement with the outer driven clutch element for affecting a low speed driving connection between said motor shaft and said transmission gears when the torque on said gears exceeds the torque on said motor shaft, means comprising a centrifically controlled braking member engageable with one of said driving clutch elements for retarding rotation thereof to accumulate sufficient energy in said spring during outward rotation of said arms to assure inward rotation thereof when the torque on said motor shaft exceeds the torque on said gears.

7. In a device of the class described, transmission means comprising a plurality of different speed gears, a driven clutch element for each gear, variable driving clutch elements comprising means for selectively engaging said driven clutch elements, a spring for normally retaining said driving clutch element in engagement with the driven clutch element of a high speed gear, a torque controlled actuating member for moving said driving clutch element against the action of said spring and into engagement with a clutch element of a lower speed gear, a releasable brake on the clutch element of said lower speed gear for applying a predetermined torsional resistance thereon, and means for releasing said brake when said lower speed gear is rotated at a predetermined speed.

8. In a device of the class described, the combination with a driving shaft of a driven unit comprising a plurality of driven clutch elements, a driving unit on said driving shaft adapted for movement relative to said driven unit and comprising a housing having an aperture therein, variable clutch elements pivotally mounted on said housing, worms on said shaft and driving unit respectively operable by the difference of the torque on said driving and driven units for moving said variable clutch elements from one driven clutch element to another, centrifugally operable stops on one of said driven clutch elements adapted to spread apart and hold said driving and driven units against relative movement during high speed operations, and means for retaining said stops in registration with said aperture during low speed operation for allowing relative movement of said units.

9. In a torque controlled gear changing mechanism, a driving unit comprising variable clutch elements, a spring bearing against said variable clutch elements to urge the same toward one position, a driven clutch unit comprising a nest of driven clutch elements, transmission worms arranged for shifting said variable clutch elements from one driven clutch element to another, centrifugal means for retaining said driving clutch elements in contact with a predetermined driven clutch element at high speed operation, and centrifugally operable braking means on one of said driven clutch elements adaptable to apply an initial torsional resistance thereon during low speed operation for assuring the accumulation of sufficient energy in said spring to return the variable clutch elements to a high speed setting when said brake is released by the attainment of a predetermined speed of rotation.

Signed at Chicago this 24th day of September, 1928.

FRED W. MAYER.